United States Patent [19]

Caron

[11] Patent Number: 5,394,502
[45] Date of Patent: Feb. 28, 1995

[54] FIBER OPTIC CABLE HARNESS BREAK-OUT FITTING

[75] Inventor: Ronald J. Caron, Newtown, Conn.

[73] Assignee: United Technologies Corporation, Hartford, Conn.

[21] Appl. No.: 171,073

[22] Filed: Dec. 21, 1993

[51] Int. Cl.⁶ .......................... G02B 6/44; H02G 3/02
[52] U.S. Cl. ..................................... 385/134; 385/100; 385/136; 385/137; 385/147; 174/72 R; 174/72 A
[58] Field of Search .................... 385/44, 66, 84, 100, 385/104, 109, 114, 115, 134, 135, 136, 137, 139, 147; 174/70 R, 71 R, 72 R, 72 A

[56] References Cited

U.S. PATENT DOCUMENTS

| | | | |
|---|---|---|---|
| 4,226,504 | 10/1980 | Bellino | 385/100 X |
| 4,496,212 | 1/1985 | Harvey | 385/136 X |
| 4,648,168 | 3/1987 | Nolf et al. | 385/135 X |
| 4,874,908 | 10/1989 | Johansson | 174/72 A |
| 4,898,542 | 2/1990 | Jones, Jr. | 385/136 X |
| 4,926,675 | 6/1990 | Stevenson | 356/73.1 |
| 4,991,928 | 2/1991 | Zimmer | 385/137 X |
| 5,092,663 | 3/1992 | Hivner | 385/100 |
| 5,125,060 | 6/1992 | Edmundson | 385/100 |
| 5,142,606 | 8/1992 | Carney et al. | 385/134 |
| 5,210,812 | 5/1993 | Nilsson et al. | 385/100 |
| 5,212,750 | 5/1993 | Wright | 385/113 X |
| 5,237,640 | 8/1993 | Pedraza et al. | 385/136 |
| 5,241,617 | 8/1993 | Peacock et al. | 385/135 |
| 5,267,338 | 11/1993 | Bullock et al. | 385/100 |

*Primary Examiner*—Brian Healy
*Attorney, Agent, or Firm*—Michael Grillo

[57] ABSTRACT

A fiber optic cable harness break-out fitting (10) is provided with a pair of support legs (12, 14) for supporting contact with a fiber optic cable harness (42) having a plurality of fiber optic cables (45). A take-off tube (20) is positioned between the support legs (12, 14), and the fitting is positioned on the harness such that fiber optic cables (47) which break-out from the fiber optic cable harness are received through a throat (22) of the take-off tube (20). Support surfaces (37,39) are provided between each of the legs (12,14) and the take-off tube (20), the surfaces having a controlled radius to control the degree of bend in the break-out fibers (47). The legs (12,14) are mounted on the harness (42) using tie down material (53), and the end of the take-off tube is slotted (24) such that the break-out fibers exiting the tube are secured within the tube with tie down material (53), the slots providing the necessary flexibility to allow the take-off tube end to securely grip the break-out fibers. The fitting may be provided in two halves (60,62) for installation in pre-existing fiber optic cable systems and for easy installation in new fiber optic cable systems.

12 Claims, 2 Drawing Sheets

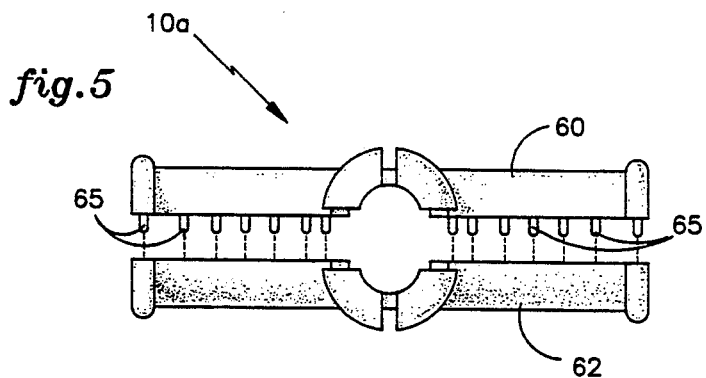
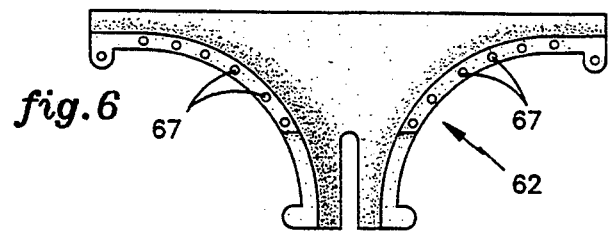
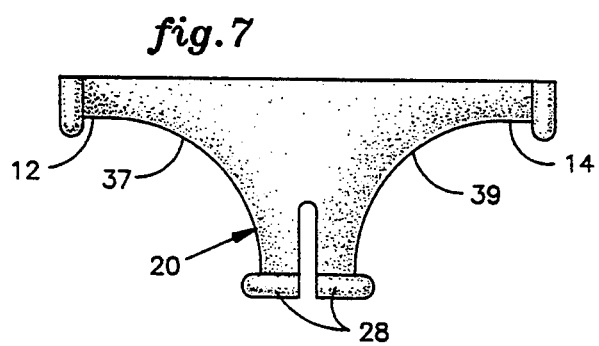
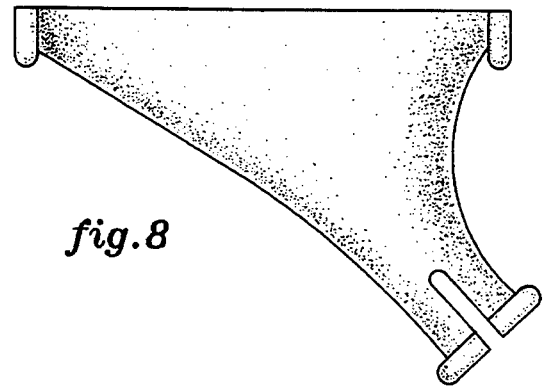

FIBER OPTIC CABLE HARNESS BREAK-OUT FITTING

TECHNICAL FIELD

The present invention relates to fiber optic cable, and more particularly, to a break-out fitting which supports and controls the bending radius of a fiber optic cable at a break-out location from a fiber optic cable harness.

BACKGROUND OF THE INVENTION

Cables which transmit information from one point to another by lo use of light energy and which utilize glass, plastic, or other signal carriers are typically referred to as fiber optic cables or optical data transmission cables. Fiber optic cables include optical fibers that typically are fabricated by drawing down a glass rod that contains a core region and a cladding region. The resulting drawn fibers provide a transmission path in the core region for light energy. When compared to metallic wire cables, fiber optic cables are superior in several respects.

For example, fiber optic cables have more possible signal channels because they utilize a wider band width than the electromagnetic band width used with metal conductors. Additionally, fiber optic cables typically have lower dB losses, and therefore have a much greater efficiency than metallic conductor systems.

However, metallic conductor systems have one great advantage over fiber optic systems in that metallic conductors are much stronger than fiber optic cables since most fiber optic cables are made of glass. If a fiber optic cable is subject to vibrations, severe bending, flexing, twisting or any other mechanical or physical force, the fiber may break, whereas in a system utilizing metallic conductors, the chances of breakage are much less. Additionally, when a fiber optic cable is bent, some of the energy may pass through the fiber cladding and be absorbed by the fiber coating. This may create a localized loss of light which is indicated by a reduction in the transmitted power. Different fiber and cable constructions have been found to provide various magnitudes of loss for a given fiber bend.

One example of when bending and possible breakage of fiber optic cables may occur is in a system having a bundle or harness containing a plurality of fiber optic cables. Along the length of the fiber optic cable harness, break-outs are provided wherein one or more of the fiber optic cables in the harness branch out for connection to a particular component within the system.

A fiber optic cable harness typically consists of multiple cable (termini-to-termini) segments secured in a bundle. The fiber optic cable harness is usually constructed by tying a bundle of fiber optic cables (segments) with spot ties (cable ties) made of a material such as MIL-T-43435 type II polyester lacing tape. In a harness having more than two connectors, groups of fiber optic cables are routed to each connector in break-outs from the main harness (trunk line) in a "T" pattern. Cable ties are used to hold the bundled cable segments together and to form the break-outs. The break-outs are formed by tying the trunk line on either side of the break-out location and bending the applicable segments away from the trunk line to form a branch. The branch is then secured into a bundle with additional cable ties.

During formation of a harness, a sharp bend may occur in individual cable segments at the break-out locations. This may occur due to excess tension being applied to one or more of the cables within the break-out bundle when an installer pulls on the branch. Excessive dB losses may occur at the location of a sharp bend. If the bend in a branch is excessive and the tension on the branch is large, individual fiber optic cables may crack or otherwise sever, resulting in a total loss of signal transmission.

SUMMARY OF THE INVENTION

Objects of the invention include the provision of a fiber optic cable harness break-out fitting which supports fiber optic cables at a break-out location on a fiber optic cable harness, and which controls the degree of bending of a fiber optic cable at the location of the break-out from the harness.

Another object of the present invention is to provide a fiber optic cable harness break-out fitting which minimizes dB losses in fiber optic cables at harness branch break-out locations.

According to the present invention, a fiber optic cable harness break-out fitting is provided with a pair of support legs for supporting contact with a fiber optic cable harness having a plurality of fiber optic cables, a take-off tube is positioned between the support legs, and the fitting is positioned on the harness such that the fiber optic cables that break-out from the fiber optic cable harness are received through a throat of the take-off tube, support surfaces are provided between each of the legs and the take-off tube, the surfaces having a controlled radius to control the degree of bend in the break-out fibers, the surfaces also providing for the transfer of tensile loads applied to the break-out fibers to the harness without allowing sharp bending of the break-out fibers.

In further accord with the present invention, the legs are mounted on the harness using tie down material, and the end of the take-off tube is slotted such that the break-out fibers exiting the tube are secured within the tube with tie down material, the slots providing the necessary flexibility to allow the take-off tube end to securely grip the break-out fibers.

In still further accord with the present invention, the angular relationship of the take-off tube to the legs is selected to provide the desired exit angle of the break-out fibers from the harness.

In further accord with the present invention, the fitting may be provided in two halves for installation in pre-existing fiber optic cable systems and for easy installation in new fiber optic cable systems.

The fiber optic cable harness break-out fitting of the present invention provides a significant improvement over the prior art by controlling the curvature radius of fiber optic cable segments that break-out from a fiber optic cable harness, thereby minimizing dB losses which may occur due to the existence of sharp bends in the fibers. Additionally, the harness provides for the transfer of tensile loads applied to the break-out fibers to the harness to further minimize the possibility of severance of one of the break-out fibers. The inside diameter of the fitting is selected to accommodate various size cables or cable bunches, and additionally, a cushioning material, such as silicon rubber tape, may be used within the fitting to cushion and allow secure gripping of smaller diameter branches which exit through the take-off tube. The take-off tube may be positioned at various angles with respect to the harness to allow the desired exit angle of a fiber or group of fibers from the harness.

Additionally, the fitting may be provided in two halves to allow retrofit of the fitting in a pre-existing fiber optic cable systems and ease of installation in new fiber optic cable installations.

The foregoing and other objects, features, and advantages of the present invention will become more apparent in light of the following detailed description of exemplary embodiments thereof, as illustrated in the accompanying drawings.

BRIEF DESCRIPTION OF THE DRAWINGS

FIG. 5 is a end view showing two halves of an alternative embodiment of the fitting of FIG. 1;

FIG. 6 is top view showing the bottom half of the fitting of FIG. 5;

FIG. 7 is a top view of a second alternative embodiment of the fitting of FIG. 1;

FIG. 8 is a top view of a third alternative embodiment of the fitting of FIG. 1;

BEST MODE FOR CARRYING OUT THE INVENTION

The fiber optic cable harness break-out fitting of the present invention is particularly well suited for minimizing dB losses in fiber optic cables at harness break-out locations. Additionally, the fitting of the present invention controls the degree of bending of fiber optic cables at break-out locations and minimizes the stress and strain on the fibers at the break-out locations.

Figure 1:
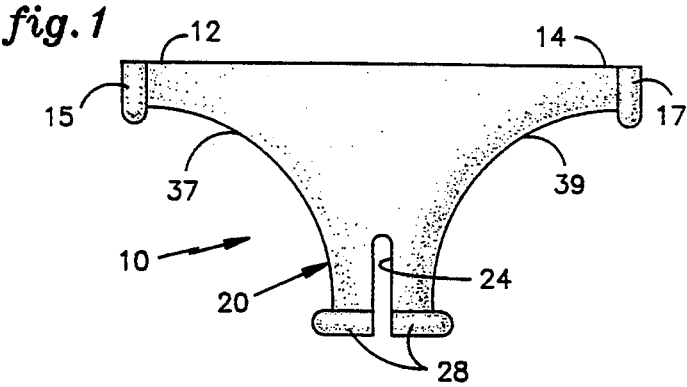
FIG. 1 is a top view of the fiber optic cable harness break-out fitting of the present invention.

Referring to FIG. 1 a top view of the fiber optic cable harness break-out fitting 10 (fitting) is shown. The fitting is preferably manufactured from a lightweight, strong, and durable material which provides flexibility and support for the fiber optic cables. Additionally, if the fitting will be subject to environmental conditions, it should be manufactured of a material which is resistant to damage caused by exposure to the environment. The preferred material for manufacture of the fitting is an ultra-violet light resistant nylon.

Figure 2:
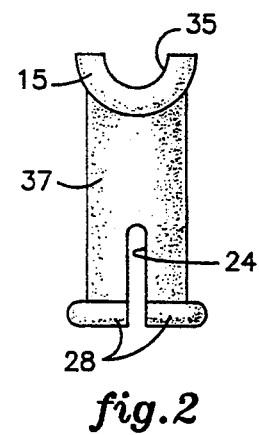
FIG. 2 is a side view of the fitting of FIG. 1.
Figure 3:
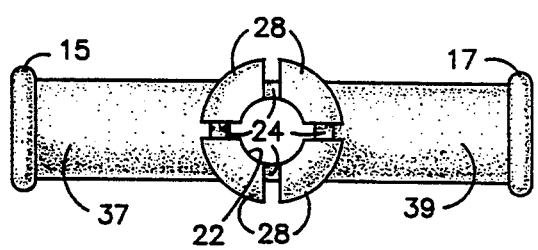
FIG. 3 is an end view of the fitting of FIG. 1.

Referring to FIGS. 1, 2 and 3, the fitting 10 comprises a pair of support legs 12, 14 for supporting contact with a fiber optic cable harness. Reinforcing members 15, 17 are mounted on the ends of the support legs for reinforcement of the support legs. Additionally, the reinforcing members are of a larger outside diameter then the support legs such that when a tie down material such as lacing tape is wrapped around the support legs and fiber optic cable harness, the reinforcing member retains the tie down material on the support legs and prevents the tie-down material from slipping off the support legs.

A take-off tube 20 is positioned between the support legs, the tube having a throat 22 for receiving fiber optic cables which break-out from the fiber optic cable harness (break-out fibers). A plurality of slots 24 are provided in the end of the take-off tube 20 to thereby allow the end of the take-off tube to easily deform to grip break-out fibers contained therein. Additionally, reinforcing members 28 are mounted on the end of the take-off tube to reinforce the take-off tube end and to retain tie down material on the take-off tube. When tie down material is securely applied around the end of the take-off tube, the end of the take-off tube deforms due to the slots 24 formed therein to securely grip any break-out fibers contained in the throat 22.

The interior surfaces 35 of the fitting are smooth and provide an inside diameter to accommodate a break-out fiber or a bundle of break-out fibers. As described in greater detail hereinafter, the dimensions of the fitting 10 may be varied to accommodate various size break-out fibers and break-out fiber bundles. Supporting surfaces 37, 39 are provided between each of the support legs and the take-off tube. The curvature of the supporting surfaces is selected to control the radius of curvature of break-out fibers contained therein. Additionally, the supporting surfaces transfer tensile loads applied to a break-out fiber or bundle of break-out fibers to the harness without allowing sharp bending of individual fibers.

Figure 4:
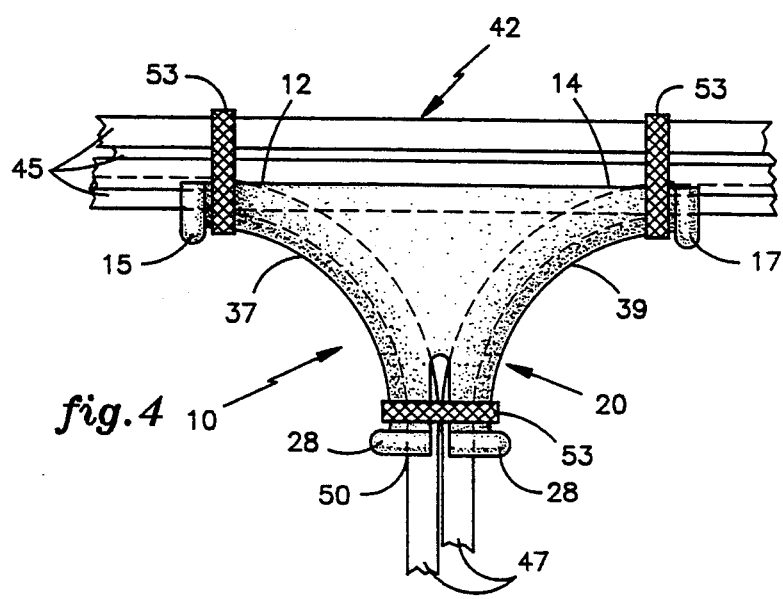
FIG. 4 is a top view showing the fitting of FIG. 1 installed on a fiber optic cable harness.

Referring to FIG. 4, the operation of the fitting is best understood by example. In FIG. 4, the fitting 10 is shown installed on a fiber optic cable harness 42 comprised of a plurality of fiber optic cables 45. The fitting 10 is positioned with respect to the harness 42 such that the take-off tube 20 is located at a fiber break-out location. Break-out fibers 47 are fed through the throat 22 (FIG. 3) of the take-off tube 20, and the fitting 10 is slid down along the break-out fibers until the legs 12, 14 come in contact with the harness 42. The fitting is selected such that the radius of curvature provided by the support surfaces 37, 39 provides the desired curvature to minimize dB losses in the break-out fibers 47. Additionally, a fitting must be selected such that the interior surfaces 35 (FIG. 2) and the inside diameter of the throat 22 (FIG. 3) can accommodate the break-out fibers 47. To provide improved gripping and strain relief of the break-out fibers, a cushioning material 50 such as silicon rubber tape may be positioned between the break-out fibers 47 and the take-off tube. Once the fitting is assembled on the harness, tie down material 53 is applied to the fitting adjacent to the legs 15, 17 and the end of the take-off tube 20 to secure the legs to the harness and the break-out fibers within the take-off tube. The reinforcing members 15, 17, 28 prevent the tie down material 53 from sliding off the fitting. The tie down material should be applied sufficiently tight to securely grip the fiber optic cables without damaging the fiber optic cables. A preferred tie down material is polyester lacing tape.

Although the fitting 10 is illustrated as being a single component structure in FIGS. 1 through 4, it may be desirable to provide the fitting in two halves as illustrated in FIGS. 5 and 6. Referring to FIGS. 5 and 6, an upper half 60 of a fitting 10a is shown in spaced relation to a lower half 62 of the fitting 10a. Alignment tabs 65 may be provided on the upper half 60 to be received in recesses 67 in the lower half 62 for alignment of the upper half 60 to the lower half 62. The tabs 65 and the recesses 67 may be formed such that the upper half is snap fit to the lower half so that when the tabs are received in the recesses, the upper half and the lower half are securely attached together. A fitting formed in two halves as illustrated in FIGS. 5 and 6 is particularly useful for installation in a pre-existing fiber optic cable system for providing controlled curvature of break-out fibers and also to prevent cracking of the break-out fibers. Additionally, a fitting provided in two halves as illustrated in FIGS. 5 and 6 may be useful in a new fiber optic cable installation where the feed through of a break-out fiber through the throat of the take-off tube would be particularly difficult due to space requirements or the physical length of the break-out fiber. Although the fitting is shown divided in half by a horizontal section of the fitting illustrated in FIG. 3, it will be understood by those skilled in the art that the fitting may be halved by a vertical section of the fitting illustrated in FIG. 3.

The bending radius of a fiber at which dB losses occur may vary based on the construction of the fiber. Therefore, it may be desirable to provide fittings which have support surfaces 37, 39 of varying radius. The fitting illustrated in FIG. 7 is an example of a fitting which provides a reduced radius of curvature for an optical fiber contained therein. Although not shown in FIG. 7, it also may be desirable to provide a fitting which has a smaller or larger internal surface 35 depending on the number of break-out fibers and the radius of the individual break-out fibers contained within the fitting.

It may also be desirable to provide fittings which provide various break-out angles with respect to the fiber optic cable harness. Break-out angle is defined as the angle at which break-out fibers leave the fiber optic cable harness. The break-out angle may vary due to the location of the various components interconnected by the fiber optic cables and the physical constraint of the area which is used to provide the fiber optic cable runs. The fittings illustrated in FIGS. 1 through 7 provide a 90° break-out angle of the break-out fibers with respect to the harness 42. However, the alternative embodiment illustrated in FIG. 8 illustrates a 45° break-out angle of the break-out fibers 47 with respect to the harness. As will be understood by those skilled in the art, fittings which provide various break-out angles with respect to the harness may be provided as desired.

Although the invention has been described and illustrated with respect to exemplary embodiments thereof, it should be understood by those skilled in the art that the foregoing and various other changes, omissions and additions may be made therein and thereto without departing from the spirit and scope of the present invention.

I claim:

1. A fiber optic cable harness break-out fitting for use at a fiber optic cable break-out location on a fiber optic cable harness containing a plurality of fiber optic cables, said fitting comprising:
   a pair of support legs for supporting contact with said harness;
   a take-off tube having a throat, said take-off tube being positioned between said support legs, said fitting being positioned with respect to said harness such that break-out fibers which exit said harness at said break-out location are received through said throat; and
   a pair of support surfaces between each of said legs and said take-off tube, said support surfaces having a controlled radius for controlling the degree of bend in said break-out fibers.

2. A fiber optic cable harness break-out fitting according to claim 1 further comprising reinforcing members mounted on the ends of said legs and said take-off tube.

3. A fiber optic cable harness break-out fitting according to claim 1 further comprising:
   slots formed in the end of said take-off tube; and
   tie-down means received over the end of said take-off tube in the region of said slots;
   said slots allowing the end of said take-off tube to flex and grip said break-out fibers contained therein in response to pressure applied by said tie-down means.

4. A fiber optic cable harness break-out fitting according to claim 3 further comprising reinforcing members mounted on the ends of said legs and said take-off tube, said take-off tube reinforcing member retaining said tie-down means on said take-off tube.

5. A fiber optic cable harness break-out fitting according to claim 4 further comprising tie-down means mounted on the ends of said legs adjacent to said reinforcing members, said tie-down means securing said fitting on said harness, said reinforcing means retaining said tie-down means on said legs.

6. A fiber optic cable harness break-out fitting according to claim 1 further comprising tie-down means mounted on the ends of said legs for securing said fitting on said harness.

7. A fiber optic cable harness break-out fitting according to claim 1 further comprising:
   a fitting first half, and
   a fitting second half.

8. A fiber optic cable harness break-out fitting according to claim 7 further comprising fastening means for attaching said first half and said second half together.

9. A fiber optic cable harness break-out fitting according to claim 7 further comprising alignment means for aligning said first half and said second half.

10. A fiber optic cable harness break-out fitting according to claim 5 further comprising:
    a fitting first half, and
    a fitting second half.

11. A fiber optic cable harness break-out fitting according to claim 10 further comprising fastening means for attaching said first half and said second half together.

12. A fiber optic cable harness break-out fitting according to claim 10 further comprising alignment means for aligning said first half and said second half.

* * * * *